United States Patent [19]

McAlister et al.

[11] Patent Number: 4,478,809
[45] Date of Patent: Oct. 23, 1984

[54] ECONOMIZER ARRANGEMENT

[75] Inventors: Donald R. McAlister, Ballwin, Mo.; Steven A. Ziebold, Waterloo, Ill.

[73] Assignee: Monsanto Company, St. Louis, Mo.

[21] Appl. No.: 459,288

[22] Filed: Jan. 20, 1983

[51] Int. Cl.³ ................. C01B 17/90; B22B 19/00
[52] U.S. Cl. ................. 423/522; 422/160; 165/134 DP; 165/1; 165/103; 423/531
[58] Field of Search ........... 423/522, 531, 533, 539; 422/160, 161; 165/103, 134 DP, 143, 144, 1

[56] References Cited

U.S. PATENT DOCUMENTS

| 3,194,214 | 7/1965 | Frendberg | 165/134 DP |
| 4,318,366 | 3/1982 | Tompkins | 165/134 DP |

FOREIGN PATENT DOCUMENTS

| 28848 | 5/1981 | European Pat. Off. | 423/522 |
| 2451114 | 4/1976 | Fed. Rep. of Germany | 423/533 |
| 154311 | 3/1982 | German Democratic Rep. | 165/134 DP |
| 54119392 | 9/1979 | Japan | 423/522 |
| 54151590 | 11/1979 | Japan | 423/522 |
| 54152691 | 12/1979 | Japan | 423/522 |
| 745627 | 2/1956 | United Kingdom | 423/522 |
| 2088595 | 5/1982 | United Kingdom | 165/134 DP |

OTHER PUBLICATIONS

Browder, T. J., Improvements in Sulfuric Acid Process C.E.P.; Mar. 1977; pp. 70-76.

Primary Examiner—Gary p. Straub
Attorney, Agent, or Firm—Lawrence L. Limpus

[57] ABSTRACT

This invention provides a method of removing heat from the process gas in a sulfuric acid plant having interpass and final absorption towers by indirect heat exchange with a liquid without condensing acidic vapors from said process gas. The method comprises installing first and second economizers, the second economizer having first and second sections for liquid flow. The process gas flow through the first economizer before passing through the interpass absorption tower and through the second economizer before passing through the final absorption tower. A liquid flows through the first and second economizers for indirect heat exchange with the process gas, the liquid passing sequentially through the second section of the second economizer, the first economizer, and the first section of the second economizer. The second section of the second economizer is used to preheat the liquid before the liquid enters the first economizer to prevent any portion of the first economizer from cooling to the dew point of the vapors, thus preventing condensation of vapor, and to increase the heat removed from the process gas.

8 Claims, 7 Drawing Figures

ECONOMIZER ARRANGEMENT

BACKGROUND OF THE INVENTION

This invention relates to a novel process flow configuration for economizers in a sulfuric acid plant. This invention also relates to a method of operation of the economizers to increase the heat which may be removed from the sulfuric acid process. More particularly, this invention relates to a novel process flow configuration and a method of operation for economizers which provides for the removal of more heat from the sulfuric acid process while eliminating the corrosion caused by the condensation of sulfuric acid or oleum within the economizer.

DESCRIPTION OF THE PRIOR ART

The process for the manufacture of sulfuric acid starts with the oxidation or burning of sulfur to form sulfur dioxide. The process may also start with the sulfur-dioxide containing gases created by the processing of sulfur containing metal ores. The sulfur dioxide is then catalytically oxidized in a converter to sulfur trioxide which is removed from the gas stream in one or more absorption stages to form sulfuric acid. The oxidation of sulfur dioxide to sulfur trioxide is an exothermic reaction. In the past the design of sulfuric acid plants has concentrated on using the heat that is created by the process to heat the gas streams to the ignition temperature required for the conversion of sulfur dioxide to sulfur trioxide. Heat is generated in excess of that required for this function and much of it was lost to cooling water circulated through cooling towers. To prevent the loss of this heat steam is generated in boilers and low level process heat is recovered by heating boiler feed water in economizers. Alternately, economizers can provide process heat for use outside the boundaries of the sulfuric acid plant.

An economizer is defined as being an assemblage of water-filled pipes or fintubes placed in the path of escaping flue gases and used to heat feed water. Internal corrosion is avoided by the use of properly conditioned feed water and external corrosion by holding the flue gas temperature high enough to prevent the condensation and formation of liquid sulfuric acid. In a sulfuric acid plant an economizer is a heat exchanger most often constructed having a rectangular shell and fin tube type of configuration, which is used to remove heat from the sulfuric acid process.

In a typical economizer in a sulfuric acid plant, the sulfuric acid dew point controls the amount of energy that can be recovered through the use of an economizer. The acid dew point, that temperature at which the gas begins to condense to form liquid sulfuric acid, is determined primarily by the hydrocarbon content of the sulfur and/or the efficiency of the drying tower. The dew point is a critical factor in the use of the economizers as the condensation of acid on the fintubes causes corrosion and sulfate buildup between the fins of the tubes within the economizer. This shortens the life of the economizer and also reduces the recoverable energy since the heat transfer coefficient on the gas side is lowered. To prevent this condensation, it is imperative that the tubes within the economizer be maintained at a temperature greater than the acid dew point. Since liquid flow through the economizer and gas flow through the economizer are often counter-current, that is they flow in opposite directions through the economizer, the coolest portion of the economizer is the tubes located where the cool liquid enters the economizer for this is also the location of the cool exit gas. To prevent condensation of acid on the tubes at the gas exit point, it has been necessary in the past to maintain the gas temperature at a temperature far above the acid dew point; thus, great quantities of energy are lost.

SUMMARY OF THE INVENTION

It is an object of this invention to provide economizers having novel process flow configurations.

It is a further object of this invention to provide a method of operation of the economizers to increase the heat which may be removed from the sulfuric acid process while preventing the corrosion caused by the condensation of sulfuric acid within the economizers.

It is yet another object of this invention to provide an improved economizer arrangement for transferring process gas sensible heat to boiler feed water and to extend the life of the economizer by reducing the corrosion caused by sulfuric acid which condenses within the economizer.

An additional object of this invention is to provide a novel process flow configuration for economizers which includes a means of modulation to vary the energy recovered in the economizers as the dew point of the acidic gas varies.

These and other objects are obtained through novel process flow configurations which allow the liquid to be preheated to prevent the tube wall temperatures within the economizers from being reduced to a temperature lower than the dew point of the sulfuric acid containing gases.

In a modern sulfuric acid plant there are typically two absorption towers. The process gas is passed through two or more catalyst beds in a converter and then through a first absorption tower to remove the sulfur trioxide that has been produced in the catalytic reaction within the converter. This first absorption tower is commonly known as the interpass absorption tower. After passage of the process gas through the interpass absorption tower, process gas is returned to the converter for passage through one or more additional catalyst beds before the gas goes to the final absorption tower. Economizers are typically used before the interpass absorption tower and the final absorption tower.

First and second economizers are used in this invention. The process gas passing from an intermediate catalyst bed of the converter to the interpass absorption tower passes through the first economizer and the process gas passing from the final catalyst bed of the converter to the final absorption tower passes through the second economizer. The economizers are typically fabricated as a shell and tube type of heat exchanger. Within the second economizer the tubes are divided into two separate sections. There are, thus, the equivalent of three economizers while only two economizer shells are utilized. It is imperative that the liquid and gas flow through the economizers, in accordance with this invention, such that in no instance does the temperature of the tube walls within the economizer fall below the dew point of the gaseous sulfuric acid. If the temperature of the tube walls falls below the dew point of the gaseous sulfuric acid, condensation of the sulfuric acid will occur and will severely corrode the tubes of the economizer and impede heat transfer. The dew point of the gas passing through the first economizer is a much higher temperature than the dew point of the gas passing through the second economizer. This relationship between the dew points is primarily a result of the much higher water or sulfuric acid content in the vapor phase of the gas passing through the first economizer. As a result, the tube wall temperature at the gas exit of the first economizer is the most critical. To protect against the condensation of sulfuric acid on the tube walls at the gas exit of the first economizer, the liquid is first preheated by passing through the coldest, or second, of the two separate sections of tubes in the second economizer. By preheating the liquid flow in the second economizer in this manner, the tube walls within the first economizer may be maintained above the acid dew point. The gas passing through the second economizer contains a much lower percentage of water or sulfuric acid content in the vapor phase and thus has a much lower dew point temperature than the gas passing through the first economizer. It is therefore unnecessary, except in rare instances, to be concerned about the tube wall temperature at the gas exit of the second economizer. Only in very rare instances will the tube wall temperature at the gas exit of the second economizer approach the dew point of the sulfuric acid.

In the most simple configuration of this invention, the process gas passing from an intermediate stage of the converter to the interpass absorption tower passes through a first economizer. Process gas passing from the final catalyst bed of the converter to the final absorption tower passes through a second economizer. The tubes in the second economizer, as described above, are divided into first and second sections for liquid flow and the heated process gas from the converter passes sequentially through said first and second sections around the tubes to the gas exit of the economizer. The liquid stream to be heated first passes through the second tube section of the second economizer wherein the liquid stream is initially heated. The invention includes means for directing the flow of the liquid stream sequentially through the second tube section of the second economizer, the first economizer, and the first tube section of the second economizer for indirect heat exchange between the heated process gas and the liquid stream. The preheating of the liquid stream as it passes through the second tube section of the second economizer protects the tubes within the first economizer from corrosion caused by the condensation of sulfuric acid by keeping the tube wall temperature within the first economizer above the dew point of the sulfuric acid while optimizing the heat removed from the heated process gas.

While the most simple arrangement has been described hereinabove, the invention encompasses the use of many process flow configurations which are used to ratio the liquid flow between the first and second sections of the second economizer and between the first and second economizers. In addition to process flow configurations which ratio the liquid flows among the economizer sections, this invention includes the optional use of a bypass around one or more sections of the economizers to bypass the heated process gas or the liquid stream or both. This allows the economizers to be designed to achieve the maximum, or optimum, heat recovery from the process gas while maintaining the economizer tubes at a temperature above the acid dew point to prevent the condensation of acidic vapors from the process gas. It may be easily seen that a greater heat recovery will mean the warming of more of a liquid stream.

A more complex example of the novel process flow configurations of this invention includes a first economizer through which the process gas passes before entering the interpass absorption tower. The process gas passing from the final catalyst bed of the converter to the final absorption tower passes through a second economizer which has first and second sections for flow of the liquid stream. The invention further includes means for passing the liquid stream through the second section of the second economizer to preheat the liquid stream; means for dividing the liquid stream following passage through the second section of the second economizer; means for passing a portion of the divided liquid stream through the first economizer for indirect heat exchange with the heated process gas without condensation of vapors within the first economizer; means for passing the remainder of the divided liquid stream through the first section of the second economizer for indirect heat exchange with the heated process gas; means for recombining the portion of the divided liquid stream following the first economizer and the remainder of the divided liquid stream following the first section of the second economizer; and means for adjusting the ratio of liquid flow between the portion of the divided liquid stream and the remainder of the divided liquid stream in accordance with the temperature of the liquid stream, the temperature of the process gas at the gas exit of the first economizer, and the dew point of the acidic vapor within the process gas to optimize the removal of heat from the heated process gas and to prevent the condensation of acidic vapor within the first and second economizers.

Optionally the process flow configurations may include a liquid stream bypass around the second section of the second economizer. The liquid stream bypass includes means for controlling liquid flow through the bypass such that a bypass portion of the liquid stream passes through the bypass and mixes with the portion of the liquid stream entering the first economizer after passing through the second section of the second economizer to reduce the liquid temperature available at the first economizer to optimize the removal of heat from the heated process gas while preventing condensation of acidic vapor within the first economizer.

A gas bypass may optionally be included in the process flow configurations of this invention. The gas bypass is around the first section of the second economizer. The gas bypass includes means for controlling the gas flow through the gas bypass such that a portion of the heated process gas passes through the gas bypass and the remainder of the heated process gas flows through the first section of the second economizer. Connection means are provided and the portion of the heated process gas flowing through the gas bypass enters the second section of the second economizer through the connection means. The entry of the portion of the heated process gas from the gas bypass into the second section of the second economizer increases the temperature of the process gas within the second section and, through indirect heat exchange, raises the preheat temperature of the liquid stream.

The invention further includes the operation of the above described apparatus in a method of optimizing the removal of heat from a heated process gas without condensing acidic vapor within the first and second economizers.

During operation of the economizers of this invention, the temperature of the liquid is primarily controlled by the size of each of the economizer sections relative to one another and the volume of liquid passing through each section. The temperature, for example, of the liquid entering the first economizer, and therefore approximately the temperature of the economizer tubes at the gas exit point, is determined by the size of the heat transfer area within the second section of the second economizer, that is the liquid stream preheater section of the second economizer.

DESCRIPTION OF THE PREFERRED EMBODIMENTS

For the purposes of the following description of this invention, it will be assumed that the economizers are being used to heat boiler feed water. It is noted that the economizers could easily be used to heat another process stream. Each of these uses would be equal as the important factor is that excess heat generated by the process of manufacturing sulfuric acid is being profitably used rather than being lost or wasted in a cooling tower.

Figure 1:
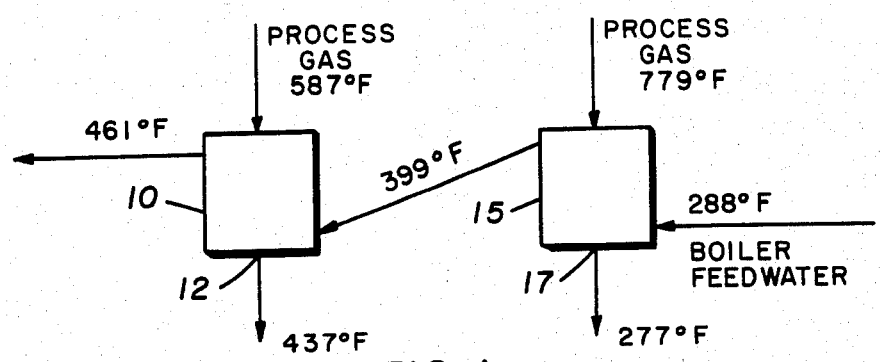
FIGS. 1 and 2 are schematics of an economizer as used in the prior art.

Turning now to FIG. 1, a schematic of economizers as used in sulfuric acid plants in the prior art is shown. A first economizer 10 is used to cool the heated process gas passing from an intermediate catalyst stage of the converter to the interpass absorption tower. A second economizer 15 is used to cool the heated process gas passing from the last catalyst bed of the converter to the final absorption tower. Hot process gas from the sulfuric acid plant converter enters the economizers and is cooled during passage through the economizers. A boiler feed water flow countercurrent to the process gas flow is shown also. Countercurrent flow means that the process gas and the liquid stream flowing through the economizer flow in opposite directions. This is in contrast to concurrent flow in which the process gas and the liquid stream flow in the same direction. In this discussion, the liquid stream will flow through the interior of the fintubes within the economizer and the process gas will flow through the shell of the economizer and pass around the fintubes. For the purposes of FIG. 1, the dew point of the acidic vapor in the process gas, that is the dew point of the water or sulfuric acid in the vapor phase in the process gas, was assumed to not exceed 260° F., a typical dew point temperature within a sulfuric acid plant. It is imperative that the tube wall temperature at the gas exit 12 of the first economizer 10 and at the gas exit 17 of the second economizer 15 be maintained at a temperature greater than the dew point of the acidic vapor. Otherwise the acid condenses on the surfaces within the economizer, particularly the tube surfaces, and the liquid sulfuric acid creates excessive corrosion and sulfate buildup with impeded heat transfer and early failure of the tubes.

In FIG. 1, the heated process gas is shown entering the first economizer 10 at a temperature of 587° F. and is shown exiting from the first economizer at a cooler temperature of 437° F. The heated process gas is shown entering the second economizer 15 at a temperature of 779° F. and is shown exiting from the second economizer at a cooler temperature of 277° F. The boiler feed water is shown entering the second economizer 15 at a temperature of 228° F., passing between the second economizer 15 and the first economizer 10 at a temperature of 399° F., and exiting from the first economizer 10 at a temperature of 461° F. The temperatures shown are typical numbers for a sulfuric acid plant. Not shown in FIG. 1 is the temperature of the tube walls at the gas exit 12 of first economizer 10 and gas exit 17 of second economizer 15. The gas exit is the coolest portion of the economizer when countercurrent flow is used as the coolest liquid stream temperature and the coolest process gas temperature are both reached at the gas exit. It is possible to measure the tube wall temperature in a field installation; however, for purposes of this discussion that temperature will be approximated. It is known that the coefficient of heat transfer for the liquid stream, the boiler feed water, is much greater than the heat transfer coefficient for the process gas. Therefore, the tube wall temperature will be closer to the temperature of the entering liquid stream than to the temperature of the exiting process gas. An equation for the approximation of the tube wall temperature is shown in equation 1:

$$T_t = T_w + R(T_g - T_w) \quad (1)$$

where
$T_t$ = temperature of the tube wall,
$T_w$ = temperature of the entering liquid stream;
$T_g$ = temperature of the exiting process gas, and
R = variable coefficient.

In practice the value of R is related to the areas and heat transfer coefficients for the liquid stream and the process gas. In a sulfuric acid plant R may be approximated as one-fifth, a typical number for the tube and fin geometries and process conditions that are used. The temperature of the tube walls will thus be approximated as being equal to the temperature of the boiler feed water plus one-fifth of the temperature differential between the entering boiler feed water and the existing process gas. This approximation is shown in equation 2:

$$T_t = T_w + 1/5(T_g - T_w) \quad (2)$$

where
$T_t$, $T_w$, and $T_g$ are as defined above. Thus, substituting the temperature shown in FIG. 1 for the first economizer 10 into equation (2), it is shown:

$$T_t = 399° F. + 1/5(437° F. - 399° F.)$$

$$T_t = 406° F.$$

This tube wall temperature of 406° F. is much higher than the typical vapor or acid dew point for process gas passing to the interpass absorption tower; thus, there will be no condensation of the acid in the gas stream at the gas exit 12. It must be noted that the liquid stream entering the first economizer 10 has a temperature far above the acid dew point. This liquid stream temperature removes concerns regarding acid condensation within economizer 10; however, since the process gas cannot be cooled to a temperature lower than the entering liquid stream temperature, this liquid stream temperature prevents the removal of great amounts of heat from the process gas as it passes through first economizer 10.

A typical dew point for the acid vapor in the process gas entering the interpass absorption tower, that is the gas passing through first economizer 10, is approximately 260° F. The dew point of the vapor in the process gas passing through the second economizer 15 to the final absorption tower is typically much lower, for example approximately 170° F., because a high percentage of the water and sulfuric acid is removed in the interpass absorption tower and never reaches the second economizer 15. Substituting the temperatures shown for second economizer 15 in FIG. 1 into equation (2) it is shown:

$$T_t = 228° F. + 1/5(277° F. - 228° F.)$$

$$T_t = 238° F.$$

Again, this tube wall temperature at the gas exit 17 is above the acid dew point of approximately 170° F. Only in very rare instances will the tube wall temperature at the gas exit 17 of the second economizer 15 approach the dew point of the sulfuric acid. It has been shown that great quantities of energy are lost in this configuration as the temperature of the process gas at the gas exit is much greater than the dew point of the acidic vapor within the process gas. This energy is typically lost to cooling water circulated through cooling towers.

Figure 2:
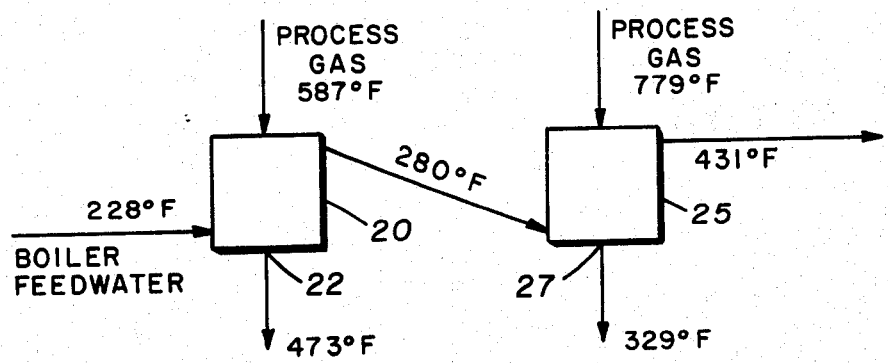

Turning now to FIG. 2, a schematic of the prior art similar to that in FIG. 1 is shown. As in FIG. 1, the process gas passes through first economizer 20 before passing through the interpass absorption tower. The process gas passes through second economizer 25 before passing through the final absorption tower. A boiler feed water flow countercurrent to the gas flow is shown also; however, in FIG. 2 the liquid stream flow first enters first economizer 20. Again, the tube wall temperature at the gas exit 22 of first economizer 20 becomes the most critical for this is the point at which the coolest liquid stream temperature and coolest process gas temperature exists and, in first economizer 20, the dew point of the acidic vapor within the process gas is a relatively high temperature.

In FIG. 2 the process gas is shown entering first economizer 20 at a temperature of 587° F. and is shown at the gas exit 22 at a cooler temperature of 473° F. The process gas is shown entering the second economizer 25 at 779° F. and is shown exiting from the second economizer at gas exit 27 at a temperature of 329° F. The boiler feed water is shown entering the first economizer 20 at a temperature of 228° F., between the first economizer 20 and second economizer 25 at a temperature of 280° F. and exiting from the second economizer 25 at a temperature of 431° F. Substituting the temperatures shown for the first economizer 20 in FIG. 2 into equation (2), it is shown:

$$T_t = 228° F. + 1/5 (473° F. - 228° F.)$$

$$T_t = 277° F.$$

This tube wall temperature of 277° F. is above the acid dew point of 260° F. There will be no condensation of the acid in the gas stream; however, minor reductions in the temperature of the boiler feed water or of the process gas and a small rise in the dew point of the vapor within the process gas could cause the gas temperature at the gas exit 22 of first economizer 20 to reach or fall below the dew point and condensation of sulfuric acid would result. Even if temperature fluctuations and the potential condensation of sulfuric acid do not occur, the process gas temperature at the gas exit 22 remains a high temperature and energy in the form of heat is being lost. Looking at second economizer 25, the temperature of the entering liquid stream and of the process gas at gas exit 27 are both much higher than the typical acid dew point of 170°; thus, condensation of sulfuric acid within second economizer 25 need not be considered. To prevent condensation caused by fluctuating temperatures when the tube wall temperature at the gas exit is approaching the dew point, as was seen with first economizer 20, economizers in the past would be designed so that a safety factor could be maintained. This safety factor increased the heat being lost to water circulating through the cooling towers.

Figure 3:
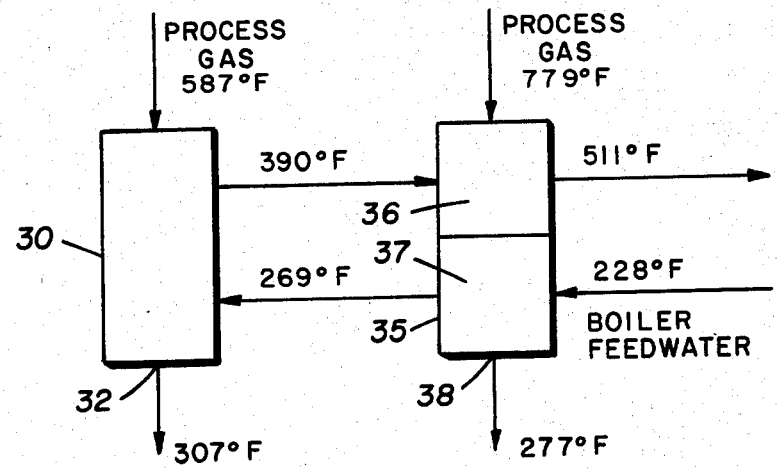
FIGS. 3, 4 and 5 are schematics of the economizers of this invention.

Turning now to FIG. 3 a schematic of an embodiment of this invention is shown. In this embodiment two economizers are used, a first economizer for the gas stream to the interpass absorption column and a second economizer for the gas stream to the final absorption tower. The first economizer 30 utilizes the process gas going to the interpass absorption tower. The gas enters the economizer 30 at a temperature of 587° F. and exits at the gas exit 32 at a temperature of 307° F. The second economizer 35 accepts the process gas passing to the final absorption tower. The tubes for the boiler feed water in second economizer 35 are divided into two separate sections, a first section 36 and a second section 37, in a manner known to those skilled in the art. A first section 36 serves as the final heating section for the boiler feed water and the second section 37 of economizer 35 serves as the preheater for the boiler feed water.

It is thus seen that the combination of the first economizer 30 and second economizer 35 provides three economizer sections.

A typical acid dew point for the process gas entering the interpass absorption tower, that is the gas to first economizer 30, is approximately 260° F. The dew point of the gas passing through the second economizer 35 is typically much lower, for example approximately 170° F., because a high percentage of the water and sulfuric acid is removed in the interpass absorption tower and never reaches the second economizer 35. The liquid stream, boiler feed water, first enters the second section 37 of second economizer 35 where it is preheated. The liquid then passes through the first economizer 30 and is returned to the first section 36 of second economizer 35 where the heating is completed. Process gas to the interpass absorption tower passes through first economizer 30 and is cooled while the process gas to the final absorption tower passes sequentially through the first and section sections of the second economizer 35 and is cooled. Typical temperatures for the boiler feed water and the two process gas streams are shown in FIG. 3.

The consideration of the acid dew point and the tube wall temperature at the gas exit 32 from the first economizer 30 is as important with the economizer piping arrangement of this invention as it is with the economizers of the prior art. The approximation of tube wall temperature which was discussed in conjunction with FIGS. 1 and 2 is as useful in this situation as it is in the prior discussions; therefore, equation (2) will be used to consider the tube wall temperature at the gas exit 32 of first economizer 30. Looking at the first economizer 30, the gas and liquid are in countercurrent flow; thus, the coldest liquid temperature is met with the coldest gas temperature. The tube wall temperature at the gas exit 32 of economizer 30 is approximated by equation (2) to be equal to:

$$T_t = 269° \text{ F.} + 1/5(307° \text{ F.} - 269° \text{ F.})$$

$$T_t = 277° \text{ F.}$$

which is a temperature above, though very close to, the acid dew point of 260° F.; thus, there will be no condensation of sulfuric acid at this portion of the tubes. It is noted that the liquid temperature at the entrance and exit of the second section 37 of economizer 35, and the gas temperature at the gas exit 38, are all above the dew point of the sulfuric acid, which is approximately 170° F.; thus, there will be no condensation of the acid from the process gas within second economizer 35.

With the preheating of the boiler feed water in the second section 37 of the second economizer 35, the tube wall temperatures at the gas exit 32 of first economizer 30 are maintained above the dew point while the gas exit temperatures are greatly reduced from that normally seen in sulfuric acid plants. The exit gas temperatures for the first economizers 10, 20, and 30 shown in FIGS. 1 through 3 demonstrate the energy recoveries which are made possible through the use of this invention. Economizer 10 had an exit gas temperature of 437° F.; economizer 20 had an exit gas temperature of 473° F.; and economizer 30, an embodiment of this invention, had an exit gas temperature of 307° F. With the configuration shown in FIG. 3 which utilizes a portion of the second economizer 35 as a liquid preheater, it is possible to recover a great amount more energy than is recovered in a typical sulfuric acid plant.

Heretofore the discussion has concentrated upon the apparatus of this invention; however, this invention also includes a method of removing heat from the process gas in a sulfuric acid plant having interpass and final absorption towers by indirect heat exchange with a liquid without condensing acidic vapors from said process gas. The method comprises installing first and second economizers 30 and 35. The second economizer 35 has first and second sections 36 and 37 for liquid flow. The process gas flows through the first economizer 30 before passing through the interpass absorption tower and through the second economizer 35 before passing through the final absorption tower. A liquid flows through the first and second economizers 30 and 35 for indirect heat exchange with the process gas, the liquid passing sequentially through the second section 37 of second economizer 35, the first economizer 30, and the first section 36 of the second economizer 35. The second section 37 of second economizer 35 is used to preheat the liquid before the liquid enters the first economizer 30 to prevent any portion of the first economizer 30 from cooling to the dew point of the vapors, thus preventing condensation of vapor, and to increase the heat removed from the process gas.

Figure 4:
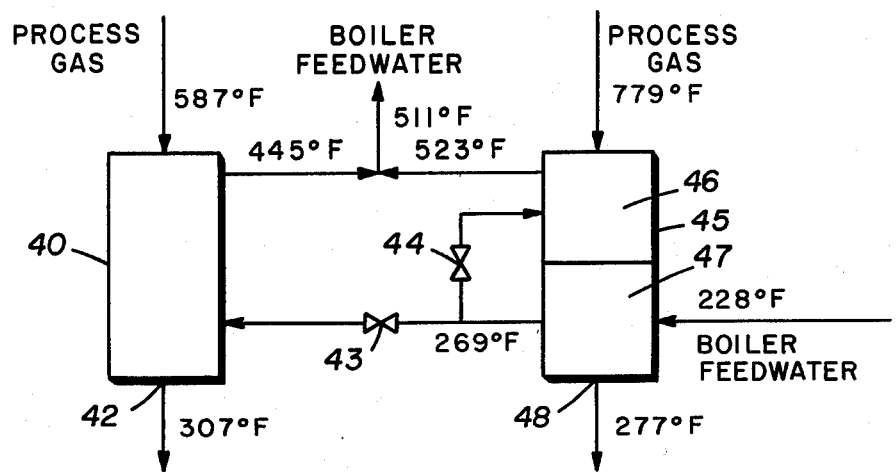

FIG. 4 is very similar to FIG. 3. A first economizer 40 is used to cool the process gas passing to the interpass absorption tower and a second economizer 45 having a first section 46 and a second section 47 is used to cool the process gas passing to the final absorption tower. The difference between the embodiment shown in FIG. 3 and the embodiment shown in FIG. 4 is the routing of the liquid stream, the boiler feed water, after it is preheated in the second section 47 of second economizer 45. The liquid stream after being preheated is divided with valves 43 and 44 being used to adjust the ratio of the liquid stream flows for maximum heat recovery. A portion of the boiler feed water flows through valve 43 to first economizer 40 for indirect heat exchange with the heated process gas without condensation of vapor within the first economizer 40. The remainder of the preheated boiler feed water passes through valve 44 to the first section 46 of second economizer 45 for indirect heat exchange with the process gas. The divided liquid streams, the portion passing through first economizer 40 and the remainder passing through the first section 46 of second economizer 45, are shown being recombined after passage through the first economizer 40 and the first section 46 of second economizer 45 respectively, but this is not required. It is noted that the temperatures of the two liquid streams before recombining are different reflecting the optimization of the heat removal from the process gas passing through the separate economizers. Valves 43 and 44 are utilized to adjust the ratio of the liquid flow between the portion of the liquid stream passing through first economizer 40 and the remainder of the liquid stream passing through first section 46 of second economizer 45 to maintain the temperature of the economizer tubes at the gas exit 42 of first economizer 40 above the dew point of the process gas. The ratio is adjusted in accordance with the temperature of the liquid stream, the temperature of the process gas at the gas exit 42 from first economizer 40, and the dew point of the acidic vapor in the process gas to optimize the removal of heat from the heated process gas and to prevent condensation of acidic vapor in first and second economizers 40 and 45. The temperature of the liquid stream is primarily determined by the size of the heat transfer area in the second section 47 of second economizer 45. Valves 43 and 44 may then be used to make adjustments to the flow of the liquid stream to vary the tube wall temperature at gas exit 42. The temperatures shown in FIG. 4 are the result of having 32% of the liquid stream flowing through valve 44 and 68% of the liquid stream flowing through valve 43. Valves 43 and 44 may be manipulated to adjust the liquid flows through the first economizer 40 to optimize the energy recovery while keeping the tube wall temperatures at the gas exit 42 from falling below whatever the acid dew point may be in a given situation.

The approximation of tube wall temperature which was discussed in conjunction with FIGS. 1 and 2 is as useful in this situation as it was in the prior discussions; therefore, equation (2) will be used to consider the tube wall temperature at the gas exit 42 of first economizer 40. Looking at the first economizer 40, the gas and liquid are in countercurrent flow; thus, the coldest liquid temperature is met with the coldest gas temperature. The tube wall temperature at the gas exit 42 of first economizer 40 is approximated by equation (2) to be equal to:

$$T_t = 269° \text{ F.} + 1/5(307° \text{ F.} - 269° \text{ F.})$$

$$T_t = 277° \text{ F.}$$

which is a temperature above the acid dew point of 260° F.; thus, there will be no condensation of sulfuric acid at this portion of the tubes. The tube wall temperature at the gas exit 42 is above the dew point and it is therefore possible to consider further reducing the temperature of the liquid entering the first economizer 40.

The dew point of the gas passing through second economizer 45 is typically approximately 170° F. The temperature of the liquid entering second section 47 of economizer 45, the coldest liquid temperature, is 228° F. in this example. Thus, the liquid temperature is above the dew point of the gaseous sulfuric acid and no condensation will occur on the tubes of second economizer 45.

Figure 5:
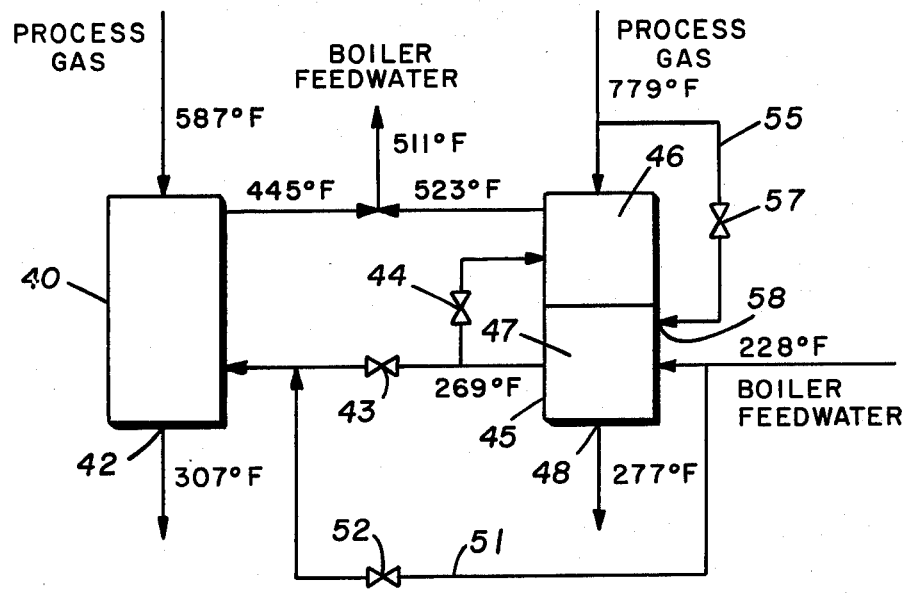

FIG. 5 provides an illustration of optional process flow configurations which may be used to improve the control of temperature within the economizers. The economizers and the related process flow configuration shown in FIGS. 5 are identical to the economizers and process flow configuration shown in FIG. 4 and the same numerals have been used in each Figure to represent the identical item of equipment, for example the first economizer 40 in FIG. 4 is also the first economizer 40 in FIG. 5.

The tube wall temperature at the gas exit 42 from first economizer 40 is approximated by equation (2) to be equal to:

$$T_t = 269° \text{ F.} + 1/5(307° \text{ F.} - 269° \text{ F.})$$

$$T_t = 277° \text{ F.}$$

which is a temperature above the acid dew point of 260° F.; thus, there will be no condensation of sulfuric acid on the tubes within first economizer 40. The temperature at the gas exit 42 is above the dew point and it is therefore possible to consider further reducing the temperature of the liquid entering the first economizer 40. If it is desired, a liquid stream bypass 51 may be added between the liquid feed stream 53 and the liquid entrance to first economizer 40 to bypass second section 47 of second economizer 45 to provide closer control of the liquid temperature entering the first economizer 40 to maximize removal of heat from the process gas while preventing condensation of vapor within the economizer. In this instance the optional liquid stream bypass 51 could be used to bypass the second section 47 of second economizer 45 and thus mix a colder liquid stream with the preheated liquid stream passing between the second section 47 of second economizer 45 and first economizer 40. With the dew point of 260° F. and the gas exit temperature of 307° F. it is possible to reduce the temperature of the liquid entering the first economizer 40 by the addition of cold liquid, at 228° F., carried by the liquid stream bypass 51 to the preheated liquid normally entering first economizer 40. The liquid stream bypass 51 includes the means for controlling liquid flow through the bypass. Valve 52 is operated to control the liquid flow to prevent the temperature at gas exit 42 from reaching the acid dew point. In this manner additional sensible heat may be recovered from the gas stream passing through first economizer 40 without allowing the tube wall temperature at the gas exit 42 to decrease to the dew point. Thus, condensation of sulfuric acid is prevented and the life of the economizer is extended.

The dew point of the gas passing through second economizer 45 is typically approximately 170° F. The temperature of the liquid entering second section 47 of economizer 45, the coldest liquid temperature, is 228° F. in this example. Thus, the liquid temperature is above the dew point of the gaseous sulfuric acid and no condensation will occur on the tubes of second economizer 45.

It is recognized that the acid dew point in a flowing gas stream in a sulfuric acid plant is not a constant temperature. Therefore, as discussed hereinabove, this invention may include a liquid stream bypass 51 around the second section 47 of the second economizer 45. If the dew point of the acid in the process gas passing through first economizer 40 were to rise, liquid flow through the bypass 51 would be reduced by valve 52 to increase the temperature of the liquid entering the first economizer 40. A reduction in the cold liquid being mixed with the preheated liquid which has passed through second section 47 of second economizer 45 raises the temperature of the liquid entering first economizer 40 and consequentially raises the temperatures of the tubes within first economizer 40 at the gas exit 42 to a temperature above the higher acid dew point. While the first economizer 40 and second economizer 45 may be sized to operate without the use of a liquid stream bypass 51, the use of the bypass 51 increases the options for temperature control within the economizer 40 and for increased heat recovery while maintaining protection against condensation on the tube walls within the economizer 40 and the resulting rapid corrosion. The ability to control the tube wall temperatures at the gas exits of both first and second economizers is greatly improved. Moreover, when the design and method of operation of this invention are used in conjunction with a dew point meter, the sulfuric acid plant can control the gas cooling so that maximum energy recovery is nearly always realized.

Another option for control of temperature to optimize the heat recovered from the process gas is the addition of a gas bypass 55 around the first section 46 of second economizer 40. The gas bypass 55 includes a means for controlling gas flow through the gas bypass 55 which is valve 57 and connection means 58 through which the gas flowing through the gas bypass 55 enters the second section 47 of second economizer 45.

If the dew point of the vapor in the process gas passing through first economizer 40 raises above the design temperature it may be necessary to provide an increased amount of preheat to the liquid stream, the boiler feed water, passing through the second section 47 of second economizer 45. Valve 57 in gas bypass 55 may be opened such that a portion of the heated process gas flows through the gas bypass 55 while the remainder of the heated process gas continues to flow through the first section 46 of second economizer 45. The portion of the heated process gas passing through gas bypass 55 passes through connection means 58 into the second section 47 of second economizer 45. Since it has not been cooled by heat exchange, the portion of the process gas passing through gas bypass 55 increases the temperature of the process gas within the second section 47 of second economizer 45 and therefore raises the preheated temperature of the liquid stream passing through the second section 47. This creates an increase in the liquid temperature entering the first economizer 40 to again have a tube wall temperature within first economizer 40 above the higher dew point to prevent condensation and the resulting corrosion.

The use of the liquid stream bypass 51 and the gas bypass 55 allows a wider span of temperature control than otherwise could be achieved.

Figure 6:
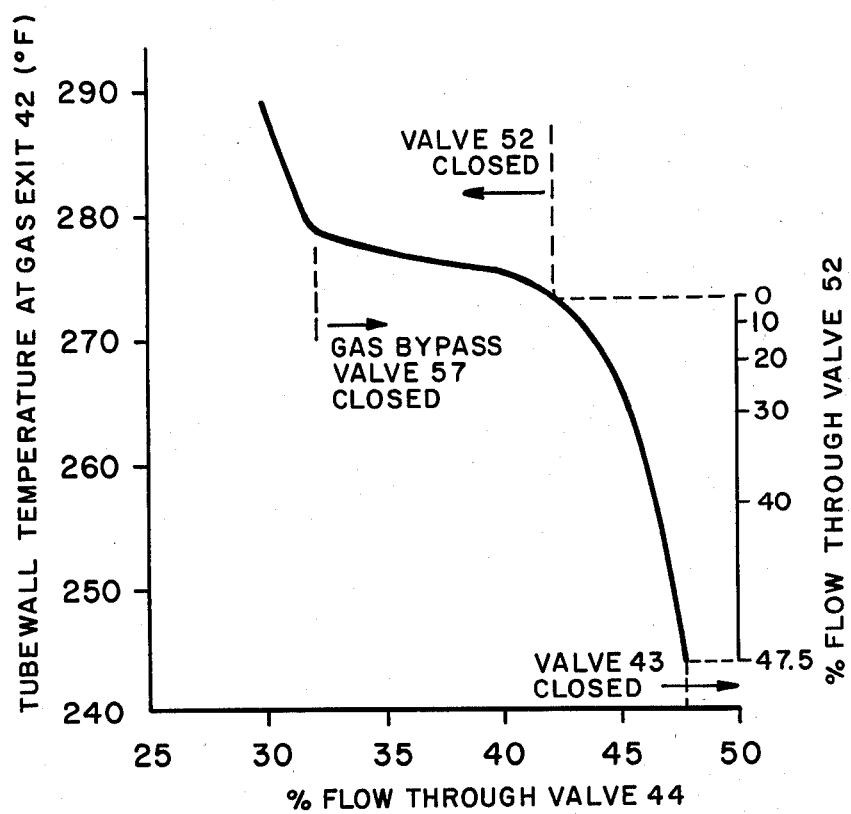
FIG. 6 is a graph showing the tube wall temperature at the gas exit of the first economizer as operating conditions are changed.

FIG. 6 is a graph showing the relationship between the tube wall temperature at gas exit 42 of first economizer 40 and the liquid and gas flow through the several valves used for temperature control in FIG. 5. It is shown in the center portion of the graph where the slope is very slight, that the use of only valves 43 and 44 to ratio the liquid stream flow between the first economizer 40 and the first section 46 of second economizer 45 has little effect on varying the tube wall temperature at the gas exit 42 of first economizer 40. When only valves 43 and 44 are in use, the temperature of the tubewall at gas exit 42 is primarily determined by the heat transfer surface area within the second section 47 of second economizer 45 which preheats the liquid stream. The sharply rising temperature curve on the left portion of the graph illustrates the sharp effect created by opening the gas bypass valve 57. Similarly, the sharply dropping curve in the right portion of the graph illustrates the sharp drop in tubewall temperature at gas exit 42 which may be created by opening the liquid stream bypass 52. The graph shows the wide span of temperature control available for heat removal from the process gas while preventing the condensation of vapor within first and second economizers 40 and 45.

Figure 7:
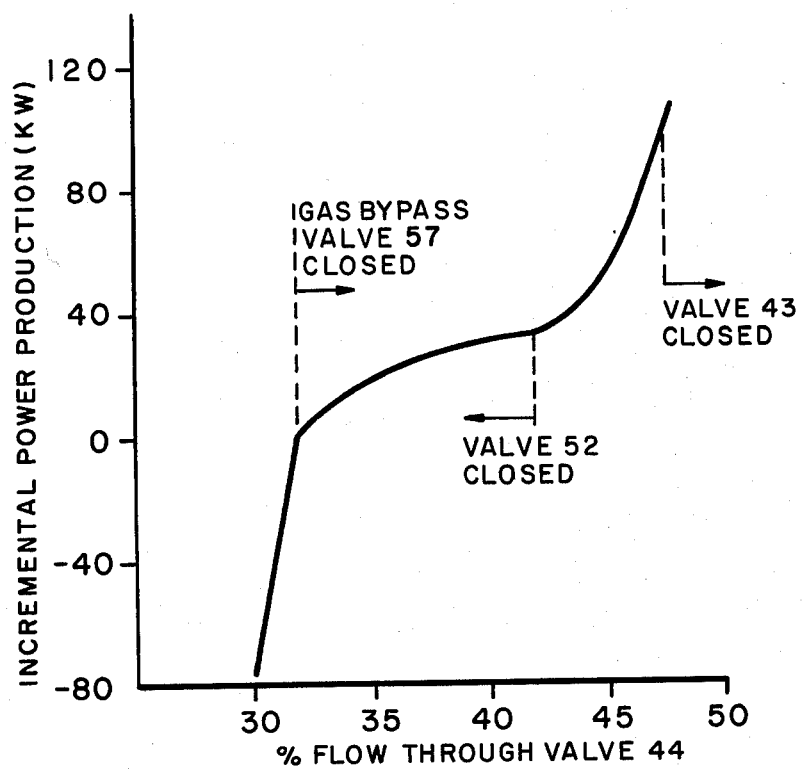
FIG. 7 is a graph relating incremental power production to changing operating conditions.

FIG. 6 illustrated the temperature control available in the process flow configurations of this invention. However, the object of this invention is to increase the heat removed from the process gas while preventing condensation of vapor, and corrosion, within the economizers. The process flow configuration is designed to optimize the heat removed from the process gas. FIG. 7 illustrates this optimization as a graph of the incremental power produced in a sulfuric acid plant incorporating turbogeneration from the process flow configuration versus the percent of the liquid flow through valve 44 which controls the preheated liquid flow between the second section 47 of second economizer 45 and the first section 46 of second economizer 45. An incremental power of zero is the design basis for the flow configuration. When the gas bypass valve 57 is open great amounts of power are quickly lost. When valve 57 is open the heat in the process gas is being used in the second section 47 of second economizer 45 to preheat the liquid stream to raise the temperature at gas exit 42 in first economizer 40 instead of passing through the first section 46 of second economizer 45 to provide final heating to the liquid stream. Heat is thereby transferred to first economizer 40 to prevent condensation of vapor and a corresponding reduction in the heating of the boiler feed water occurs. In the portion of the graph on the right the effect of opening the liquid stream bypass valve 52 is shown. Cooler temperatures are desired at the gas exit 42 of economizer 40; thus, the liquid bypass valve 52 is opened and valve 44 is opened further to allow additional preheated liquid to flow to the first section 46 of second economizer 45. The opening of these two valves increases the heat recovered from the process gas, thus increasing the incremental power production. Again, the heat removed from the process gas has been optimized without condensation of vapor within the economizers.

The foregoing description of the several embodiments of this invention is not intended to limit the invention. As will be apparent to those skilled in the art, the inventive concept set forth herein can find many applications, and many variations on and modifications to the embodiments described above may be made without departure from the spirit and scope of this invention.

We claim:

1. A method of optimizing the removal of heat from the heated process gas in a sulfuric acid plant having a converter having first and second sections and interpass and final absorption towers without condensation of vapors while increasing the heat removed from said process gas comprising:
   installing first and second economizers, said second economizer having first and second sections for liquid flow;
   passing said heated process gas through said first economizer for removal of heat after said first section of said converter and before passing said process gas through said interpass absorption tower;
   passing said heated process gas through said second economizer for removal of heat after said second section of said converter and before passing said process gas through said final absorption tower, said process gas passing sequentially through said first and second sections of said second economizer;
   passing a liquid stream sequentially through said second section of said second economizer, said first economizer, and said first section of said second economizer for indirect heat exchange with said heated process gas; and
   using said second section of said second economizer to preheat said liquid stream before said liquid stream enters said first economizer to prevent any portion of said first economizer from cooling to the dew point of said vapors, preventing condensation of said vapors, and to increase the heat removed from said heated process gas.

2. A method of optimizing the removal of heat from the heated process gas in a sulfuric acid plant having a converter having first and second sections and interpass and final absorption towers without condensation vapors while increasing the heat removed from said process gas comprising:
   installing first and second economizers, said second economizer having first and second sections for liquid flow;
   passing said heated process gas through said first economizer for removal of heat after said first section of said converter and before passing said process gas through said interpass absorption tower;
   passing said heated process gas through said second economizer for removal of heat after said second section of said converter and before passing said process gas through said final absorption tower, said process gas passing sequentially through said first and second sections of said second economizer;
   passing a liquid stream through said second section of said second economizer for indirect heat exchange with said heated process gas, said liquid stream being preheated by said passage to prevent condensation of said vapors within said first economizer;
   dividing said liquid stream following passage through said second section of said second economizer;
   passing a portion of said liquid stream through said first economizer for indirect heat exchange with said heated process gas without condensation of vapors within said first economizer from said process gas;
   passing the remainder of said liquid stream through said first section of said second economizer; for indirect heat exchange with said heated process gas;

operating a means for dividing said liquid stream into said portion of said liquid stream and said remainder of said liquid stream following said second section of said second economizer; and adjusting the ratio of flow between said portion of said liquid stream and said remainder of said liquid stream with said means for dividing said liquid stream in accordance with the temperature of said liquid stream, the temperature of said process gas at the gas exit from said first economizer, and the dew point of said vapor, to optimize the removal of heat from said heated process gas and to prevent the condensation of vapor within said first and second economizers.

3. The method of claim 2 further comprising:

controlling a liquid stream bypass around said second section of said second economizer;

flowing a bypass portion of said liquid stream through said liquid stream bypass; and mixing said bypass portion of said liquid stream with said portion of said liquid stream entering said first economizer to reduce the liquid temperature available to optimize the removal of heat from said heated process gas while preventing condensation of vapor within said first and second economizers.

4. The method of claim 2 further comprising:

controlling a gas bypass around said first section of said second economizer;

flowing a portion of said heated process gas through said gas bypass and the remainder of said heated process gas through said first section of said second economizer;

mixing said portion of said heated process gas and said remainder of said heated process gas within said second section of said second economizer to increase the temperature of said heated process gas within said second section of said second economizer; and preheating said liquid stream to a higher temperature when the dew point of said vapor in said heated process gas in said first economizer rises to prevent condensation of said vapor within said first and second economizers.

5. An apparatus for removing heat from the heated process gas in a sulfuric acid plant having a converter having first and second sections and interpass and final absorption towers by indirect heat exchange with a liquid stream without condensing vapors from said process gas comprising:

a first economizer, said heated process gas passing through said first economizer for removal of heat after said first section of said converter and before passing through said interpass absorption tower;

a second economizer, said heated process gas passing through said second economizer for removal of heat after said second section of said converter and before passing through said final absorption tower;

said second economizer having first and second sections for flow of said liquid stream;

means for directing flow of said liquid stream sequentially through said second section of said second economizer, said first economizer, and said first section of said second economizer for indirect heat exchange between said heated process gas and said liquid stream, said liquid stream being preheated in said second section of said second economizer to optimize the heat removed from said heated process gas and to prevent any portion of said first economizer from cooling to the dew point of said vapor to prevent condensation of said vapor.

6. An apparatus for optimizing the removal of heat from the heated process gas in a sulfuric acid plant having a converter having first and second sections and interpass and final absorption towers by indirect heat exchange with a liquid stream without condensing acidic vapor from said process gas comprising:

a first economizer, said heated process gas passing through said first economizer for removal of heat after said first section of said converter and before passing through said interpass absorption tower;

a second economizer, said heated process gas passing through said second economizer for removal of heat after said second section of said converter and before passing through said final absorption tower;

said second economizer having first and second sections for flow of said liquid stream;

means for passing said liquid stream through said second section of said second economizer, said liquid stream being preheated in said second section;

means for dividing said liquid stream following passage through said second section of said second economizer;

means for passing a portion of said liquid stream through said first economizer for indirect heat exchange with said heated process gas without condensation of vapors within said first economizer;

means for passing the remainder of said liquid stream through said first section of said second economizer for indirect heat exchange with said heated process gas;

means for recombining said portion of said liquid stream following said first economizer and said remainder of said liquid stream following said first section of said second economizer; and means for adjusting the ratio of liquid flow between said portion of said liquid stream and said remainder of said liquid stream in accordance with the temperature of said liquid stream, the temperature of said process gas at the gas exit from said first economizer, and the dew point of said acidic vapor, to optimize the removal of heat from said heated process gas and to prevent the condensation of acidic vapor within said first and second economizers.

7. The apparatus of claim 6 further comprising:

a liquid stream bypass around said second section of said second economizer;

means for controlling liquid flow through said liquid stream bypass such that a bypass portion of said liquid stream passes through said liquid stream bypass and mixes with said portion of said liquid stream entering said first economizer to reduce the liquid temperature available at said first economizer to optimize the removal of heat from said heated process gas while preventing condensation of acidic vapor within said first economizer.

8. The apparatus of claim 6 further comprising:

a gas bypass around said first section of said second economizer;

means for controlling gas flow through said gas bypass such that a portion of said heated process gas flows through said gas bypass and the remainder of said heated process gas flows through said first section of said second economizer; and
connection means through which said portion of said heated process gas flowing through said gas bypass enters said second section of said second economizer increasing the temperature of the heated process gas within said second section and raising the preheat temperature of said liquid stream.

* * * * *